United States Patent
Eddy et al.

(10) Patent No.: US 9,751,964 B2
(45) Date of Patent: *Sep. 5, 2017

(54) PROCESSES TO IMPROVE REACTOR STABILITY FOR THE PREPARATION OF ETHYLENE-BASED POLYMERS USING ASYMMETRICAL POLYENES

(71) Applicant: Dow Global Technologies LLC, Midland, MI (US)

(72) Inventors: Christopher R. Eddy, Lake Jackson, TX (US); John O. Osby, Lake Jackson, TX (US); Sean W. Ewart, Pearland, TX (US); Sarat Munjal, Freeport, TX (US); Stefan Hinrichs, Wondelgem (BE); Otto J. Berbee, Hulst (NL)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/101,347

(22) PCT Filed: Dec. 23, 2014

(86) PCT No.: PCT/US2014/072214
§ 371 (c)(1),
(2) Date: Jun. 2, 2016

(87) PCT Pub. No.: WO2015/100351
PCT Pub. Date: Jul. 2, 2015

(65) Prior Publication Data
US 2016/0304643 A1    Oct. 20, 2016

Related U.S. Application Data

(60) Provisional application No. 61/920,928, filed on Dec. 26, 2013.

(51) Int. Cl.
*C08F 2/00* (2006.01)
*C08F 20/06* (2006.01)
(Continued)

(52) U.S. Cl.
CPC .................. *C08F 210/02* (2013.01)

(58) Field of Classification Search
CPC .......... C08F 210/02; C08F 2/38; C08F 10/02; C08F 110/02; C08F 4/38
(Continued)

(56) References Cited

U.S. PATENT DOCUMENTS 4,503,185 A * 3/1985 Hausman .............. C08F 218/04
524/553
4,916,255 A    4/1990 Kobayashi et al.
(Continued)

FOREIGN PATENT DOCUMENTS

WO    WO-97/45465 A1    12/1997
WO    WO-2007/110127 A1    10/2007
(Continued)

OTHER PUBLICATIONS

S.X. Zhang, et al, Runaway phenomena in low-density polyethylene autoclave reactors, AIChE Journal, 1996, pp. 2911-2925, vol. 42, issue 10.
(Continued)

*Primary Examiner* — William Cheung (57) ABSTRACT

The invention provides a process to form an ethylene-based polymer, said process comprising polymerizing ethylene and at least one asymmetrical polyene, comprising an "alpha, beta unsaturated—carbonyl end" and a "C—C double bond end," and wherein the polymerization takes place in the presence of at least one free-radical initiator, and wherein the polymerization takes place in a reactor configuration comprising at least two reaction zones, reaction zone
(Continued)

I and reaction zone i (i>2), wherein reaction zone I is downstream from reaction zone I; and wherein at least one chain transfer agent (CTA) is added to the polymerization, and wherein the CTA is a saturated hydrocarbon or an unsaturated hydrocarbon.

13 Claims, 1 Drawing Sheet

(51) Int. Cl.
*C08F 210/00* (2006.01)
*C08F 210/02* (2006.01)

(58) Field of Classification Search
USPC .................................. 526/222, 317.1, 348
See application file for complete search history.

(56) References Cited

U.S. PATENT DOCUMENTS

| | | |
|---|---|---|
| 9,150,681 B2 | 10/2015 | Osby et al. |
| 2008/0242809 A1 | 10/2008 | Neuteboom et al. |
| 2013/0333832 A1* | 12/2013 | Vittorias .................. C08F 10/02 156/244.11 |
| 2015/0197590 A1 | 7/2015 | Osby |
| 2015/0344599 A1 | 12/2015 | Osby et al. |
| 2016/0297904 A1* | 10/2016 | Berbee .................. C08F 210/02 |
| 2016/0297905 A1* | 10/2016 | Berbee .................... C08L 23/08 |

FOREIGN PATENT DOCUMENTS

| | | |
|---|---|---|
| WO | WO-2012/057975 A1 | 5/2012 |
| WO | WO-2012/084787 A1 | 6/2012 |
| WO | WO-2013/059042 A1 | 4/2013 |
| WO | WO-2013/078018 A2 | 5/2013 |
| WO | WO-2013/078224 A1 | 5/2013 |
| WO | WO-2014/003837 A1 | 1/2014 |
| WO | WO-2015/100302 A1 | 7/2015 |
| WO | WO-2015/100318 A1 | 7/2015 |
| WO | WO-2015/200426 A1 | 12/2015 |
| WO | WO-2016/209381 A1 | 12/2016 |
| WO | WO-2016/210075 A1 | 12/2016 |
| WO | WO-2016/210160 A1 | 12/2016 |
| WO | WO-2016/210308 A1 | 12/2016 |

OTHER PUBLICATIONS

Bönsel and Luft, Safety engineering studies on the explosive decomposition of compressed ethylene, Chemie Ingenieur Technik, 1995, pp. 862-864, vol. 67.

Becker and Luft, Effect of reactor contamination on highly compressed ethylene Chemie Ingenieur Technik, 2000, pp. 1538-1541, vol. 72.

S. Liu, et al., Computational Study of Cyclohexanone-Monomer Co-initiation Mechanism in Thermal Homo-polymerization of Methyl Acrylate and Methyl Methacrylate, J. Phys. Chem. A, 2012, 5337-5348.

T. Ouchi, et al., Vinyl Polymerization. 393. Radical Polymerization of Vinyl Monomer Initiated by Aliphatic Aldehyde, Bull. Chem. Soc. Jpn., 1980, pp. 748-752, vol. 53. No. 3.

J. Albert and G. Luft, Thermal decomposition of ethylene-comonomer mixtures under high pressure, AIChE Journal, 1999, pp. 2214-2222, vol. 45, issue 10.

International Application No. PCT/US2016/037809, filed Jun. 16, 2016, in the name of Dow Global Technologies LLC.

PCT/US2014/072214 International Preliminary Report on Patentability Mailed Jul. 7, 2016.

PCT/US2014/072214 Search Report and Written Opinion Mailed Mar. 24, 2015.

* cited by examiner

FIGURE 1

FIGURE 2

PROCESSES TO IMPROVE REACTOR STABILITY FOR THE PREPARATION OF ETHYLENE-BASED POLYMERS USING ASYMMETRICAL POLYENES

REFERENCE TO RELATED APPLICATION

The present application is the international application stage of PCT/US2014/072214 filed Dec. 23, 2014, which claims the benefit of U.S. Provisional Application No. 61/920,928, filed Dec. 26, 2013, and incorporated herein by reference.

BACKGROUND

Conventional low density polyethylene (LDPE) has good processability, however, when used in film and/or extrusion coating application, increased melt strength is still desired. It has been discovered that such polymers can be produced using asymmetric polyenes. However, there is a need to produce such polymers under polymerization conditions with minimized reactor fouling and good reactor stability.

Polymerization processes for LDPE polymers using various branching agents, and other methods, are described in the following: U.S. Publication No. 2008/0242809, International Publication Nos. WO 2007/110127, WO 97/45465, WO 2012/057975, WO 2012/084787, WO2013/059042, WO2013/078018, WO2013/078224, and International Application No. PCT/US13/029881 (now WO 2014/003837).

It is well known, in the industry, that under sufficiently high pressures and temperatures, or in the presence of an ignition source, ethylene can decompose into carbon, methane and hydrogen. The following mechanism is described by Zimmermann et al., in "Explosive decomposition of compressed ethylene", Chemie Ingenieur Technik (1994), 66 (10), 1386-1389: $C_2H_4 \rightarrow (1+z) C+(1-z) CH_4+2z H_2$, where z is in the range of 0 to 1, and depends on the pressure and temperature. This decomposition results in a runaway reaction, which produces very high temperatures and pressures, which could then lead to equipment damage. To avoid equipment damage during a decomposition, in practice, the reactor content is rapidly released to atmosphere through emergency relief valves, and possible treatment by vent cyclones and/or flares. Thus, ethylene decompositions are considered as highly unwanted events. Decomposition of ethylene has been studied extensively by Luft and others in the following publications: "Safety engineering studies on the explosive decomposition of compressed ethylene", Chemie Ingenieur Technik (1995), 67 (7), 862-864, "Thermal decomposition of ethylene-comonomer mixtures under high pressure" AIChE Journal (1999), 45 (10), 2214-2222, and "Effect of reactor contamination on highly compressed ethylene" Chemie Ingenieur Technik (2000), 72(12), 1538-1541. Zhang et al. have also described the phenomena in "Runaway phenomena in low-density polyethylene autoclave reactors" AIChE Journal (1996), 42 (10), 2911-2925.

Every new compound introduced in low density polyethylene manufacturing technology, and which can provide additional radicals (over those from peroxides), and therefore provide the temperature needed for the above runaway reaction, needs to be tested for decomposition sensitivity. The propensity for each compound to shift the baseline level of radicals in the process must be considered. In some cases, a given compound may generate radicals, independent of other materials injected into the reactor. In other cases, an interaction between two compounds may generate additional radicals.

The interaction of aldehydes and vinyl monomers, particularly methyl methacrylate, to generate radicals is described by Ouchi et al., in "Vinyl Polymerization. 393. Radical Polymerization of Vinyl Monomer Initiated by Aliphatic Aldehyde" Bull. Chem. Soc. Jpn., 53, 748-752 (1980). Other compounds, such as ketones, for example cyclohexanone, behave similarly as described by Liu et al., in "Computational Study of Cyclohexanone—Monomer Co-initiation Mechanism in Thermal Homo-polymerization of Methyl Acrylate and Methyl Methacrylate," J. Phys. Chem. A, 116, 5337-5348 (2012).

Fouling is an important consideration, in the use of tubular reactors for the production of high pressure, low density polyethylene. Fouling can impact capability for heating ethylene, prior to initiating reaction, or impact capability for heat removal. Oxygen ($O_2$) is a known initiator in the high pressure, low density polyethylene process. Methacrylate or acrylate based comonomers, such as ethyl acrylate, methylacrylic acid, or acrylic acid, are often stabilized with inhibitors which require oxygen ($O_2$) to function properly. For high pressure, low density polyethylene processes, which use methacrylate or acrylate based comonomers, stability of the comonomers must be managed, to ensure they will not initiate polymerization, prematurely, before they are injected into, or arrive in, a reactor zone. For a tubular polymerization, it is common practice that the ethylene feed, or a portion of the overall ethylene feed, to the reactor, is heated prior to the injection and/or activation of the initiator in the first reaction zone. Another area of concern is the secondary compressor, in which reactants are compressed to the inlet pressure of the reactor system. Typically inlet pressure for high pressure polyethylene reactor systems ranges from 1000 to 5000 bar. The secondary compressors are typically equipped with reciprocating plungers in single or multi stage compression configuration. In each adiabatic compression stage, the ethylene is heated up, and needs to be cooled down, before the next and/or final compression stage. This thermal effect could lead to premature formation of radicals, and consequently, polymer in the cylinder packing and/or valves, leading potentially to disturbed lubrication in the cylinder packing and/or higher cylinder discharge temperatures, by recompression of the ethylene due to leaking cylinder valves.

As discussed above, there remains a need for new ethylene-based polymers that have higher melt strengths and higher densities, and which can be polymerized with minimal reactor fouling and good process and reactor stability. These needs have been met by the following invention.

SUMMARY OF THE INVENTION

The invention provides a process to form an ethylene-based polymer, said process comprising polymerizing ethylene and at least one asymmetrical polyene, comprising an "alpha, beta unsaturated—carbonyl end" and a "C—C double bond end," and wherein the polymerization takes place in the presence of at least one free-radical initiator; and wherein the polymerization takes place in a reactor configuration comprising at least two reaction zones, reaction zone 1 and reaction zone i (i≥2), wherein reaction zone i is downstream from reaction zone 1; and wherein at least one chain transfer agent (CTA) is added to the polymerization, and wherein the CTA is a saturated hydrocarbon or an unsaturated hydrocarbon.

DETAILED DESCRIPTION

As discussed above, the invention provides a process to form an ethylene-based polymer, said process comprising polymerizing ethylene and at least one asymmetrical polyene, comprising an "alpha, beta unsaturated—carbonyl end" and a "C—C double bond end," and wherein the polymerization takes place in the presence of at least one free-radical initiator; and wherein the polymerization takes place in a reactor configuration comprising at least two reaction zones, reaction zone 1 and reaction zone i (i≥2), wherein reaction zone i is downstream from reaction zone 1; and wherein at least one chain transfer agent (CTA) is added to the polymerization, and wherein the CTA is a saturated hydrocarbon or an unsaturated hydrocarbon.

An inventive process may comprise a combination of two or more embodiments described herein.

In one embodiment, the CTA is selected from an alkane, an alkene, or a combination thereof. In a further embodiment, the CTA is selected from a C3-C20 alkane, a C3-C20 alkene, or a combination thereof, from a C3-C10 alkane, a C3-C10 alkene, or a combination thereof.

In one embodiment, the polyene is subject to an "oxygen removal step" prior to being fed to a reaction zone.

In one embodiment, the polyene is stored in a feed vessel, and wherein the feed vessel has a "head-space gas" comprising less than 5.0, further less than 2.0, further less than 1.0, further less than 0.5, further less than 0.2, further less than 0.1 volume percent oxygen.

In one embodiment, the polyene is fed through a compression stage directly into the reaction zone or directly into the feed to the reaction zone. The choice of feed point into the reaction and/or a reaction zone depends on several factors, including, but not limited to, the solubility of the polyene in pressurized ethylene and/or solvent, the condensation of the polyene in pressurized ethylene, and/or fouling by premature polymerization of the polyene in the pre-heater used to heat the reactor contents prior to injection of initiator.

In one embodiment, the polyene is fed directly into the reaction zone or directly into the feed to the reaction zone.

In one embodiment, the maximum temperature of the first reaction zone is greater than the maximum temperature of each consecutive reaction zone downstream from the first reaction zone.

In one embodiment, the maximum temperature in the first reaction zone is at greater than 300° C., or greater than 310° C., or greater than 320° C.

In one embodiment, the maximum temperature in the first reaction zone is at least 10° C., or at least 20° C., or at least 30° C. greater than the maximum temperature of each consecutive reaction zone.

In one embodiment, the maximum temperature of the last reaction zone is less than the maximum temperature of each prior reaction zone.

In one embodiment, no polyene is fed to reaction zone 1. In a further embodiment, the maximum temperature of the first reaction zone is greater than the maximum temperature of each consecutive reaction zone downstream from the first reaction zone.

In one embodiment, more polyene, by mass, is added to reaction zone i as compared to the amount of polyene, by mass, added to reaction zone 1. As used above, the amount of polyene is determined based on the polyene added to a reaction zone in a fresh feed (i.e., not carry-over polyene). In a further embodiment, i is greater than, or equal to, 2, further i is from 2 to 5, and further i is from 2 to 4.

In one embodiment, the polyene, by mass, is added to both reaction zone 1 and reaction zone i. In a further embodiment, i is greater than, or equal to, 2, further i is from 2 to 5, and further i is from 2 to 4.

In one embodiment, more polyene, by mass, is added to reaction zone 1 as compared to the amount of polyene, by mass, added to reaction zone i. As used above, the amount of polyene is determined based on the polyene added to a reaction zone in a fresh feed (i.e., not carry-over polyene). In a further embodiment, i is greater than, or equal to, 2, further i is from 2 to 5, and further i is from 2 to 4.

In one embodiment, polyene is added prior to, or simultaneously with, the addition of the free-radical initiator, at the inlet of the reaction zone. Preferably the polyene is added prior to the initiator addition to allow for a good dispersion of the polyene.

In one embodiment, the ethylene fed to the first reaction zone is from 10 to 100 percent of the total ethylene fed to the polymerization. In a further embodiment, the ethylene fed to the first reaction zone is from 20 to 80 percent, further from 25 to 75 percent, further from 30 to 70 percent, further from 40 to 60 percent, of the total ethylene fed to the polymerization.

The reactor configuration comprises at least one reactor. In one embodiment, the process takes place in a reactor configuration that comprises at least one tubular reactor. In a further embodiment, the maximum temperature in each reaction zone is from 150 to 360° C., further from 170 to 350° C., further from 200 to 340° C.

In one embodiment, the polymerization pressure at the first inlet of the reactor is from 1000 to 3600 bar, further from 1200 to 3500 bar, further from 1500 to 3400 bar, further from 2000 to 3200 bar.

In one embodiment, the ratio of "the concentration of the CTA in the feed to reaction zone i" to "the concentration of the CTA in the feed added to reaction zone 1" is greater than, or equal to, 1, further greater than 1, further greater than 1.5, further greater than 2.

In one embodiment, the ratio of "the concentration of the CTA in the feed to reaction zone i" to "the concentration of the CTA in the feed added to reaction zone 1" is less than 1, further less than 0.8, further less than 0.6, further less than 0.4.

Polyene

In one embodiment, the "alpha, beta unsaturated—carbonyl end" of the asymmetrical polyene is selected from the group consisting of the following:

a)

wherein R1 is selected from H, or C1-C6 alkyl, further a C1-C3 alkyl and further CH₃;

b)

wherein R2 is selected from H, or C1-C6 alkyl, further a C1-C3 alkyl and further CH₃; R3 is selected from H, CH₃, or CH₂CH₃; R4 is selected from H, CH₃, or CH₂CH₃; and n is from 1 to 50, further from 1 to 20 and further from 1 to 10;

c)

wherein R5 is selected from H, or C1-C6 alkyl, further a C1-C3 alkyl and further CH₃; and d)

wherein R'5 is selected from H, or C1-C6 alkyl, further a C1-C3 alkyl and further CH₃; and e)

In the structures a) through e) above, the notation "⁓⁓⁓" represents a break at the center of a covalent bond between the "alpha, beta unsaturated carbonyl end" of the asymmetrical polyene and the remaining chemical structure of the asymmetrical polyene.

In one embodiment, the "α, β unsaturated—carbonyl end" of the asymmetrical polyene is selected from the group consisting of the following: a) through d), as shown above.

In one embodiment, the "C—C double bond end" of the asymmetrical polyene is selected from the group consisting of the following:

1)

wherein R7 is selected from H, or C1-C6 alkyl, further a C1-C3 alkyl and further CH₃;

2)

wherein R8 is selected from H, or C1-C6 alkyl, further a C1-C3 alkyl and further CH₃;

3)

wherein R9 is selected from H, or C1-C6 alkyl, further a C1-C3 alkyl and further CH₃;

4)

5)

6)

7)

8)

9)

10)

11)

12)

wherein R10 is selected from H, or OH;

13)

14)

15)

16)

17)

wherein m=1 to 20

18)

wherein R11 is selected from H, or OH;

19)

20)

21)

22)

23)

wherein p=1 to 20

24)

wherein R12 is selected from H, or C1-C6 alkyl, further a C1-C3 alkyl and further $CH_3$; R13 is selected from H, or C1-C6 alkyl, further a C1-C3 alkyl and further $CH_3$; and R14 is selected from H, or C1-C6 alkyl, further a C1-C3 alkyl and further $CH_3$, or Ph; and

25)

wherein R15 is selected from H, or C1-C6 alkyl, further a C1-C3 alkyl and further $CH_3$; R16 is selected from H, or C1-C6 alkyl, further a C1-C3 alkyl and further $CH_3$.

In the structures 1) through 25) above, the notation "∿∿∿" represents a break at the center of a covalent bond between the "C—C double bond end" of the asymmetrical polyene and the remaining chemical structure of the asymmetrical polyene.

In one embodiment, the "C—C double bond end" of the asymmetrical polyene is selected from the group consisting of the following: 1), 2), 3), 4), 5), 6), 7), 8), 9), 10), 11), 12), 13), 14), 15), 16) and 17), each as shown above.

In one embodiment, the "C—C double bond end" of the asymmetrical polyene is selected from the group consisting of the following: 1), 2), 3), 4), 5), 6), 7), 8), 9), 10), 11) and 12), each as shown above.

In one embodiment, the "C—C double bond end" of the asymmetrical polyene is selected from the group consisting of the following: 1), 2), 3) and 12), each as shown above.

In one embodiment, the "C—C double bond end" of the asymmetrical polyene is selected from the group consisting of the following: 13), 14), 15) and 16), each as shown above.

In one embodiment, the "alpha, beta unsaturated end" of the asymmetrical polyene is selected from the group consisting of the following:

b)

wherein R2 is selected from H, or C1-C6 alkyl, further a C1-C3 alkyl and further $CH_3$; R3 is selected from H, $CH_3$, or $CH_2CH_3$; R4 is selected from H, $CH_3$, or $CH_2CH_3$; and n is from 1 to 50, further from 1 to 20 and further from 1 to 10; and in a further embodiment, when R3 and R4 are both H or when R3 is $CH_3$, or $CH_2CH_3$, then R4 is H; and when R4 is $CH_3$, or $CH_2CH_3$, then R3 is H; and c)

wherein R5 is selected from H, or C1-C6 alkyl, further a C1-C3 alkyl and further $CH_3$.

In one embodiment, the "alpha, beta unsaturated end" of the asymmetrical polyene is selected from the group consisting of the following:

b)

wherein R2 is selected from H, or C1-C6 alkyl, further a C1-C3 alkyl and further $CH_3$; R3 is selected from H, $CH_3$, or $CH_2CH_3$; R4 is selected from H, $CH_3$, or $CH_2CH_3$; and n is from 1 to 50, further from 1 to 20 and further from 1 to 10; and in a further embodiment, when R3 and R4 are both H or when R3 is $CH_3$, or $CH_2CH_3$, then R4 is H; and when R4 is $CH_3$, or $CH_2CH_3$, then R3 is H.

In one embodiment, the "alpha, beta unsaturated end" of the asymmetrical polyene is selected from the group consisting of the following:

c)

wherein R5 is selected from H, or C1-C6 alkyl, further a C1-C3 alkyl and further $CH_3$.

The reactor configuration comprises at least one reactor. In one embodiment, the asymmetrical polyene is present in an amount greater than, or equal to, 100 ppm by weight, based on the total amount by weight of ethylene in the reactor.

In one embodiment, the asymmetrical polyene is present in an amount less than, or equal to, 10000 ppm by weight, or less than, or equal to, 5000 ppm, or less than, or equal to, 1000 ppm, based on the total amount by weight of ethylene in the reactor.

In one embodiment, the asymmetrical polyene is selected from the group consisting of the following:

i)

wherein n is from 1 to 50, further from 1 to 20 and further from 1 to 10; $R_a$ is selected from H or an alkyl (preferably ethyl or methyl and more preferably methyl); $R_b$ is selected from H or an alkyl (preferably ethyl or methyl and more preferably methyl); and preferably wherein $R_a$ and $R_b$ are selected from the group consisting of (i) $R_a$ and $R_b$ are both H, (ii) when $R_a$ is methyl, then $R_b$ is H, (iii) when $R_a$ is H, then $R_b$ is methyl, and (iv) a combination of (ii) and (iii);

ii)

iii)

iv)

v)

-continued wherein m=1 to 20.

In one embodiment, the asymmetrical polyene is selected from the group consisting of i)-x), each as shown above, and the inventive ethylene-based polymer is formed in a reactor configuration comprising at least one tubular reactor.

In one embodiment, the asymmetrical polyene is selected from the group consisting of i), ii), iii), iv) and v), each as shown above.

In one embodiment, the asymmetrical polyene is selected from the group consisting of i) and v), each as shown above.

In one embodiment, the asymmetrical polyene is selected from the group consisting of vi), vii), viii) and ix), each as shown above.

In one embodiment, the asymmetrical polyene is selected from the group consisting of i), as shown above.

In one embodiment, the asymmetrical polyene is polypropylene glycol allyl ether methacrylate (PPG-AEMA or PPGAEM). See experimental section.

In one embodiment, the asymmetrical diene has $^1$H NMR signals from 3.0 to 6.5 ppm chemical shift.

In one embodiment, an inventive polymer is polymerized in the presence of at least two asymmetrical polyenes, and further two asymmetrical dienes, as disclosed herein.

An asymmetrical polyene may comprise a combination of two or more embodiments as described herein.

An asymmetrical diene may comprise a combination of two or more embodiments as described herein.

In one embodiment, the polyene is an asymmetrical diene and incorporated into the inventive ethylene-based polymer at the "α,β unsaturated—carbonyl end."

In one embodiment, the polyene is an asymmetrical diene and incorporated into the inventive ethylene-based polymer at the "C—C double bond end."

In one embodiment, the polyene is an asymmetrical diene incorporated into the inventive ethylene-based polymer at both the "α,β unsaturated—carbonyl end" and the "C—C double bond end."

A polyene may comprise a combination of two or more embodiments as described herein.

Ethylene-Based Polymer

In one embodiment, the inventive ethylene-based polymer comprises at least one incorporated structure derived from the asymmetrical polyene. As used herein, an incorporated structure derived from a polyene refers to at least a portion of a polyene which is structurally incorporated into a polymer during polymerization resulting from polymerizing the ethylene-based polymer in the presence of the polyene.

In one embodiment, the inventive ethylene-based polymer may include at least one incorporated structure derived from two or more asymmetrical polyenes. In other words, the inventive ethylene-based polymer may be polymerized in the presence of two or more polyenes.

In one embodiment, the ethylene-based polymer is a modified low density polyethylene, comprising, in polymerized form, ethylene, and bonded chemical groups derived from the asymmetrical polyene. In a further embodiment, the modified LDPE comprises less than 2.0 wt %, further less than 1.0 wt %, of other comonomer(s), based on the weight of the modified LDPE.

In one embodiment, the ethylene-based polymer comprises at least one structure selected from the group consisting of the following A through D:

A)

wherein n is from 1 to 50; $R_1$ is selected from H or a $C_1$-$C_6$ alkyl; $R_a$ is selected from H or methyl; $R_b$ is selected from H or methyl; and preferably wherein $R_a$ and $R_b$ are selected from the group consisting of (i) $R_a$ and $R_b$ are both H, (ii) when $R_a$ is methyl, then $R_b$ is H, (iii) when $R_a$ is H, then $R_b$ is methyl, and (iv) a combination of (ii) and (iii);

B)

wherein $R_1$ is selected from H or a $C_1$-$C_6$ alkyl;

C)

wherein $R_1$ is selected from H or a $C_1$-$C_6$ alkyl; and

D)

wherein $R_1$ is selected from H or a $C_1$-$C_6$ alkyl.

In one embodiment, the ethylene-based polymer comprises at least one structure selected from structures A) through C), as shown above.

In one embodiment, the ethylene-based polymer comprises at least one structure selected from structures A) and B), as shown above.

In one embodiment, the ethylene-based polymer comprises at least one structure selected from structure A), as shown above.

In one embodiment, the ethylene-based polymer comprises at least one structure selected from structure B), as shown above.

In one embodiment, the ethylene-based polymer comprises at least one structure selected from structure C), as shown above.

In one embodiment, the ethylene-based polymer comprises at least one structure selected from structure D), as shown above.

In the above structures A)-D), the notation "⸺" represents a break at the center of a covalent carbon-carbon bond in the hydrocarbon backbone of the ethylene-based polymer.

In one embodiment, the ethylene-based polymer comprises, in reacted form, greater than or equal to 0.015 moles of the asymmetrical polyene per 1000 moles of carbon atoms incorporated into the polymer, or, in other words, per 500 moles of ethylene units incorporated into the polymer. In a further embodiment, the asymmetrical polyene is an asymmetrical diene.

In one embodiment, the ethylene-based polymer comprises, in reacted form, less than or equal to 10 moles, or less than or equal to 5 moles, or less than or equal to 2 moles, or less than or equal to 1 mole of asymmetrical polyene per 1000 moles of carbon atoms incorporated into the polymer, or, in other words, per 500 moles of ethylene units incorporated into the polymer. In a further embodiment, the asymmetrical polyene is an asymmetrical diene.

In one embodiment, the ethylene-based polymer comprises, in reacted form, at least 0.03 weight percent of the asymmetrical polyene, based on the weight of the polymer. In a further embodiment, the asymmetrical polyene is an asymmetrical diene.

In one embodiment, the ethylene-based polymer has a melt index ($I_2$) from 0.1 to 100 g/10 min, or from 0.1 to 50 g/10 min, or from 0.1 to 30 g/10 min. In one embodiment, the ethylene-based polymer has an $I_2$ from 0.3 to 100 g/10 min, or from 0.3 to 50 g/10 min, or from 0.5 to 30 g/10 min, or from 1.0 to 10 g/10 min. In one embodiment, the ethylene-based polymer has an $I_2$ from 0.3 to 100 g/10 min, or from 1 to 50 g/10 min, or from 2 to 20 g/10 min, or from 2 to 10 g/10 min.

In one embodiment, the ethylene-based polymer has a weight average molecular weight (Mw(abs)) versus $I_2$ relationship meeting the following: Mw(abs)<A+B($I_2$), wherein A=$2.40\times10^5$ g/mole and B=$-8.00\times10^3$ (g/mole)/(dg/min).

In one embodiment the ethylene-based polymer has a density greater than or equal to 0.910, or greater than or equal to 0.914, or greater than or equal to 0.916 grams per cubic centimeter (g/cc or g/cm$^3$).

In one embodiment, the ethylene-based polymer has a density less than or equal to 0.940, or less than or equal to 0.935, or less than or equal to 0.932, grams per cubic centimeter (g/cc or g/cm$^3$).

In one embodiment the ethylene-based polymer has a density from 0.910 to 0.940. In one embodiment, the ethylene-based polymer has a density from 0.910 to 0.940, or from 0.915 to 0.935, or from 0.916 to 0.932 g/cc.

Preferably, in one embodiment the ethylene-based polymer has a density from 0.912 to 0.940, or from 0.915 to 0.935, or from 0.920 to 0.930, or from 0.918 to 0.926 g/cc.

In one embodiment, the ethylene-based polymer has a density of from 0.916 to 0.940, or from 0.916 to 0.921, or from 0.920 to 0.924, or from 0.923 to 0.940 g/cc.

In one embodiment, the ethylene-based polymer has a density from 0.920 to 0.940 g/cc.

In one embodiment, the ethylene-based polymer has an n-hexane extractables content of less than 4.0 wt %, or less than or equal to 3.0 wt %, or less than or equal to 2.6 wt %, or less than 2.6 wt %, based on the total weight of the polymer.

In one embodiment, the ethylene-based polymer has a density between 0.920 and 0.924 g/cc and an n-hexane extractable content less than 4.0 wt %, preferably less than 3.0 wt %, and more preferably less than 2.6 wt %, based on the total weight of the polymer.

In one embodiment, the composition further comprises an ethylene/α-olefin interpolymer with a density less than or equal to 0.954 g/cc.

In one embodiment, the composition further comprises another ethylene-based polymer that differs from the inventive ethylene-based polymer in one or more properties, for example, density, $I_2$, weight average molecular weight (Mw (abs)), number average molecular weight (Mn(conv)), and/or polydispersity index (Mw(abs)/(Mn(conv)).

The invention also provides an article comprising at least one component formed from the inventive composition.

In one embodiment, the article is a film or a coating, for example, an extrusion coating.

In one embodiment, the article is a film. In another embodiment, the article is a coating.

In one embodiment, the article is a coating for a cable or wire. In one embodiment, the cable or wire is an electrical or telecommunications wire or cable.

In one embodiment, the article is a coated sheet, and in a further embodiment the sheet is selected from a metal, a paper, or another polymer substrate or combinations thereof. In a further embodiment, the coated sheet is used in a wire or cable configuration.

In another embodiment, the coated sheet is used in a packaging application.

An inventive ethylene-based polymer may comprise a combination of two or more embodiments as described herein.

An inventive composition may comprise a combination of two or more embodiments as described herein.

An inventive article may comprise a combination of two or more embodiments as described herein.

Process

For producing a highly branched ethylene-based polymer, a high pressure, free-radical initiated polymerization process is typically used. Two different high pressure free-radical initiated polymerization process types are known. In the first type, an agitated autoclave vessel having one or more reaction zones is used. The autoclave reactor normally has several injection points for initiator or monomer feeds, or both. In the second type, a jacketed tube is used as a reactor, which has one or more reaction zones. Suitable, but not limiting, reactor lengths may be from 100 to 3000 meters (m), or from 1000 to 2000 meters. The beginning of a reaction zone, for either type of reactor, is typically defined by the side injection of either initiator of the reaction, ethylene, chain transfer agent (or telomer), comonomer(s), as well as any combination thereof. A high pressure process can be carried out in autoclave or tubular reactors having one or more reaction zones, or in a combination of autoclave and tubular reactors, each comprising one or more reaction zones.

Often a conventional chain transfer agent is used to control molecular weight. Typical CTA used for producing high pressure low density polyethylene can include, but are not limited to, propylene, isobutane, n-butane, 1-butene, methyl ethyl ketone, acetone, ethyl acetate, propionaldehyde, ISOPAR C, E or H (ExxonMobil Chemical Co.), and isopropanol. In a preferred embodiment, one or more saturated hydrocarbon or unsaturated hydrocarbon chain transfer agents (CTAs) are added to an inventive polymerization process. In one embodiment, the amount of CTA used in the process is from 0.03 to 10 weight percent of the total reaction mixture.

In one embodiment, the process includes a high pressure and low pressure recycle loop to improve ethylene efficiency, since ethylene is only partially converted or consumed per reactor pass. Typically, the conversion level per reactor pass is between 12% and 40%, with conversion levels for tubular reactors being at the higher end of that range and conversion levels for autoclave reactors being at the lower end of that range.

In one embodiment, the polymerization may take place in a tubular reactor as described in international patent application PCT/US12/059469, filed Oct. 10, 2012. This patent application describes a multi zone reactor which describes alternate locations of feeding fresh ethylene to control the ethylene to CTA ratio and therefore control polymer properties. Fresh ethylene may be simultaneously added in multiple locations to achieve the desired ethylene to chain transfer ratio. In a similar way addition of fresh CTA addition points may be carefully selected to control polymer properties as described in international patent application PCT/US12/064284 (filed Nov. 9, 2012). Fresh CTA may be simultaneously added in multiple locations to achieve the desired CTA to ethylene ratio. Likewise, the addition points and the amount of the fresh branching agents (or polyenes), described in this application, may be controlled to control gels formation while maximizing the desired property of increased melt strength and performance in targeted applications. Fresh branching agent may be simultaneously added in multiple locations to achieve the desired branching agent to ethylene ratio. The use of a branching and or coupling agent to broaden molecular weight distribution and to increase the melt strength of the polymer will put further requirements on the distribution of the CTA and the branching agent along a reactor system in order to achieve the desired change in product properties without or minimizing potential negative impacts like gel formation, reactor fouling, process instabilities, low efficiency of branching agent, etc.

In one embodiment, the polymerization takes place in at least one tubular reactor. In the multi reactor system, the autoclave reactor usually precedes the tubular reactor. The addition points and amounts of fresh ethylene, fresh CTA, and fresh branching agent may be appropriately controlled to achieve the desired ratios of CTA to ethylene and branching agent to ethylene in the feeds to and or in the reaction zones.

In one embodiment, the asymmetrical diene is added to the polymerization in an amount from 0.002 to 0.300 mole percent, further from 0.005 to 0.300 mole percent, based on the total moles of ethylene and asymmetrical diene added to the polymerization. In a further embodiment, the polymerization takes place in two reactors. In another embodiment, the polymerization takes place in one reactor with multiple or at least two reaction zones.

Ethylene used for the production of ethylene-based polymer may be purified ethylene, which is obtained by removing polar components from a loop recycle stream, or by using a reaction system configuration, such that only fresh ethylene is used for making the inventive polymer. It is not typical that purified ethylene is required to make ethylene-based polymer. In such cases ethylene from the recycle loop may be used.

In one embodiment, the ethylene-based polymer comprises ethylene and one or more comonomers, and preferably one comonomer. Comonomers include, but are not limited to, α-olefins, acrylates, methacrylates and anhydrides, each typically having no more than 20 carbon atoms. The α-olefin comonomers may have 3 to 10 carbon atoms, or in the alternative, the α-olefin comonomers may have 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene.

In one embodiment, the ethylene-based polymer comprises ethylene and at least one asymmetrical polyene as the only monomeric units.

Free radical initiators are generally used to produce the inventive ethylene-based polymers. A compound may generate a free radical via a chemical mechanism and/or via radiation. Exemplary organic peroxides include, but are not limited to, cyclic peroxides, diacyl peroxides, dialkyl peroxides, hydroperoxides, peroxycarbonates, peroxydicarbonates, peroxyesters, and peroxyketals. Preferred initiators are t-butyl peroxy pivalate, di-t-butyl peroxide, t-butyl peroxy acetate and t-butyl peroxy-2-hexanoate, or mixtures thereof. In one embodiment, these organic peroxy initiators are used in an amount from 0.001 to 0.2 weight percent, based upon the weight of polymerizable monomers.

In one embodiment, an initiator is added to at least one reaction zone of the polymerization, and wherein the initiator has a "half-life temperature at one second" greater than 255° C., preferably greater than 260° C. In a further embodiment, such initiators are used at a peak polymerization temperature from 320° C. to 350° C. In a further embodiment, the initiator comprises at least one peroxide group incorporated in a ring structure. Examples of such initiators include, but are not limited to, TRIGONOX 301 (3,6,9-triethyl-3,6,9-trimethyl-1,4,7-triperoxonaan) and TRIGONOX 311 (3,3,5,7,7-pentamethyl-1,2,4-trioxepane), both available from Akzo Nobel, and HMCH-4-AL (3,3,6,6,9,9-hexamethyl-1,2,4,5-tetroxonane) available from United Initiators. See also International Publication Nos. WO 02/14379 and WO 01/68723.

Additives

An inventive composition may comprise one or more additives. Additives include, but are not limited to, stabilizers, plasticizers, antistatic agents, pigments, dyes, nucleating agents, fillers, slip agents, fire retardants, processing aids, smoke inhibitors, viscosity control agents and anti-blocking agents. The polymer composition may, for example, comprise less than 10 percent of the combined weight of one or more additives, based on the weight of the inventive polymer.

In one embodiment the polymers of this invention are treated with one or more stabilizers, for example, antioxidants, such as IRGANOX 1010, IRGANOX 1076 and IRGAFOS 168. In general, the polymers are treated with one or more stabilizers before extrusion or other melt processes.

An inventive composition may further comprise at least one other polymer, in addition to an inventive ethylene-based polymer. Blends and mixtures of the inventive polymer with other polymers may be prepared. Suitable polymers for blending with the inventive polymers include natural and synthetic polymers. Exemplary polymers for blending include propylene-based polymers (both impact modifying polypropylene, isotactic polypropylene, atactic polypropylene, and random propylene/ethylene copolymers), various types of ethylene-based polymers, including high-pressure, free-radical LDPE, heterogeneously branched LLDPE (typically via Ziegler-Natta catalysis), homogeneously branched linear or substantially linear PE (typically via single-site, including metallocene catalysis), including multiple reactor PE ("in-reactor" compositions of heterogeneously branched PE and homogeneously branched PE, such as products disclosed in U.S. Pat. No. 6,545,088 (Kolthammer et al.); U.S. Pat. No. 6,538,070 (Cardwell, et al.); U.S. Pat. No. 6,566,446 (Parikh, et al.); U.S. Pat. No. 5,844,045 (Kolthammer et al.); U.S. Pat. No. 5,869,575 (Kolthammer et al.); and U.S. Pat. No. 6,448,341 (Kolthammer et al.)), ethylene-vinyl acetate (EVA), ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Other ethylene-based polymers include homogeneous polymers, such as olefin plastomers and elastomers (for example, polymers available under the trade designations AFFINITY Plastomers and ENGAGE Elastomers (The Dow Chemical Company) and EXACT (ExxonMobil Chemical Co.)). Propylene-based copolymers (for example, polymers available under the trade designation VERSIFY Plastomers & Elastomers (The Dow Chemical Company) and VISTAMAXX (ExxonMobil Chemical Co.) can also be useful as components in blends comprising an inventive polymer.

Applications

The polymers, polymers blends and compositions of this invention may be employed in a variety of conventional thermoplastic fabrication processes to produce useful articles, including extrusion coating onto various substrates (for example, paper, cardboard, or a metal), monolayer and multilayer films; molded articles, such as blow molded, injection molded, or rotomolded articles; coatings; fibers; and woven or non-woven fabrics.

An inventive polymer may be used in a variety of films, including but not limited to, clarity shrink films, collation shrink films, cast stretch films, silage films, stretch hood, sealants, and diaper backsheets.

Other suitable applications include, but are not limited to, wires and cables, gaskets and profiles, adhesives; footwear components, and auto interior parts.

Definitions

Unless stated to the contrary, implicit from the context, or customary in the art, all parts and percents are based on weight, and all test methods are current as of the filing date of this application.

The term "fouling" refers to the deposition (temporary or more permanent) of a polymer layer onto the surface of a reactor or other apparatus used in a polymerization set-up. A layer of this nature can impact the overall heat transfer coefficient in a process or part of a process, such as the heat transfer in a high pressure, low density tubular reactor.

The term "oxygen removal step" as used refers to the removal of dissolved oxygen (O2) from a liquid. There are many methods available for the purposes of removing oxygen from a liquid. Many of these methods require the displacement of an oxygen containing head-space gas, with a head-space gas which does not contain oxygen, such as nitrogen. Other removal methods of removal may include catalyst or adsorption.

The term "head-space gas" as used refers to gas added to the vapor space of a storage vessel either directly or by purging through the liquid. An additional feed of gas is typically required to maintain the pressure of a storage vessel within a specific pressure range.

The term "composition," as used herein, includes a mixture of materials which comprise the composition, as well as reaction products and decomposition products formed from the materials of the composition.

The terms "blend" or "polymer blend," as used, refers to a mixture of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding), or the micro level (for example, simultaneous forming within the same reactor).

The term "polymer" refers to a compound prepared by polymerizing monomers, whether of the same or a different type. The generic term polymer thus embraces the term homopolymer (which refers to polymers prepared from only one type of monomer, with the understanding that trace amounts of impurities can be incorporated into the polymer structure), and the term "interpolymer" as defined below. Trace amounts of impurities may be incorporated into and/or within the polymer.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" refers to a polymer that comprises a majority amount of polymerized ethylene, based on the weight of the polymer, and, optionally, may comprise at least one comonomer.

The term "ethylene-based interpolymer" refers to an interpolymer that comprises a majority amount of polymerized ethylene, based on the weight of the interpolymer, and comprises at least one comonomer.

The term "ethylene-based copolymer" refers to a copolymer that comprises a majority amount of polymerized ethylene, based on the weight of the copolymer, and a comonomer, as the only monomer types.

The term "propylene-based polymer" refers to a polymer that comprises a majority amount of polymerized propylene, based on the weight of the polymer, and, optionally, may comprise at least one comonomer.

The terms "rheology modifier" or "rheology modifying agent," as used herein, refer to the polyenes, as described herein, which are able to change the rheology of the polymer, for example, increase G' and melt strength, when incorporated into the polymer.

The term "high pressure polymerization process," as used herein, refers to a free radical polymerization process carried out at an elevated pressure of at least 1000 bar (100 MPa).

The terms "side stream" or "side feed stream," as used herein, refer to the ethylene-rich feed stream to sequential reaction zones.

The term "first reaction zone," as used herein, refers to the first reactor zone, where the polymerization is first initiated by the addition of radicals or components, which dissociate into, and/or generate, radicals. The first reaction zone ends at the point where there is a new feed of fresh and/or recycled ethylene and/or of radicals and/or components which dissociate into, and/or generate, radicals.

The terms "subsequent reaction zone," or "sequential reaction zone," as used herein, refer to a reactor zone which receives ethylene and polymer from a previous reactor zone, and where radicals or components, which dissociate into, and/or generate, radicals, are added at the inlet of the subsequent (or sequential) reactor zone. The subsequent (or sequential) reaction zone ends at the point where there is a new feed of fresh and/or recycled ethylene and/or of radicals and/or components which dissociate into, and/or generate, radicals; however, the nth reaction zone ends at the position of a pressure control device of the reactor system. The number of subsequent (or sequential) reaction zones is (n−1), where n is the total number of reaction zones.

The Booster compressor is a device that compresses the following: a) the low pressure recycle coming from the LPS (Low pressure Separator), and b) optionally, the recycled compressor packing leaks, each to the pressure level required at the inlet side of the Primary compressor. This compression can take place in one or multiple compression stages, and can be combined with intermediate cooling. A Booster compressor can consist of single or multiple compressor frames, and can be potentially combined with Primary compressor frame(s).

The Primary compressor is a device that compresses the following: a) the fresh incoming ethylene, and/or b) the low pressure recycle coming from the Booster compressor, and/or c) the recycled compressor packing leaks, each to the pressure level required at the inlet side of the Hyper compressor. This compression can take place in one or multiple compression stages, and can be combined with intermediate cooling. The Primary compressor can consist of single or multiple compressor frames, and can be potentially combined with Booster compressor frame(s).

Hyper compressor, or Secondary compressor, is a device that compresses the following: a) the ethylene coming from the HPR (High Pressure Recycle), and/or b) the Primary compressor, each to a pressure level required to feed the reactor at its inlet pressure set point. This compression can take place in one or multiple compression stages, and can be combined with intermediate cooling. The Hyper compressor comprises a plunger reciprocating compressor, and can consist of single or multiple compressor frame(s).

The term "CTA system" includes a single CTA, or a mixture of CTAs, added to the polymerization process, typically to control the melt index. A CTA (chain transfer agent) is a compound able to transfer a hydrogen atom to a growing polymer molecule containing a radical, by which a radical is formed on the CTA molecule, which can then initiate a new polymer chain. CTA is also known as telogen or telomer. In a preferred embodiment of the invention, each CTA system comprises a single CTA.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed.

Test Methods

Density—Samples that were measured for density were prepared according to ASTM D4703: Annex A: Method C. Samples were pressed at 190° C. and 3,000 psi for five minutes, 15 tons, for two minutes, and then cooled, under pressure, at 15° C./min Density measurements were made after conditioning at 23° C. and 50% R.H. for 40 hours prior to testing, using ASTM D792 Method B.

Melt Index—Melt index, or I2, was measured in accordance by ASTM D 1238, Condition 190° C./2.16 kg, and was reported in grams eluted per 10 minutes. The I10 was measured in accordance with ASTM D 1238, Condition 190° C./10 kg, and was reported in grams eluted per 10 minutes.

Melt Strength—Melt strength measurements are conducted on a Gottfert Rheotens 71.97 (Goettfert Inc.; Rock Hill, S.C.) attached to a Gottfert Rheotester 2000 capillary rheometer. A polymer melt is extruded through a capillary die with a flat entrance angle (180 degrees), with a capillary diameter of 2.0 mm, and an aspect ratio (capillary length/capillary diameter) of 15.

After equilibrating the samples at 190° C. for 10 minutes, the piston is run at a constant piston speed of 0.265 mm/second. The standard test temperature is 190° C. The sample is drawn uniaxially to a set of accelerating nips, located 100 mm below the die, with an acceleration of 2.4 mm/sec$^2$. The tensile force is recorded as a function of the take-up speed of the nip rolls. Melt strength is reported, as the plateau force (cN), before the strand breaks. The following conditions are used in the melt strength measurements: plunger speed=0.265 mm/sec; wheel acceleration=2.4 mm/sec$^2$; capillary diameter=2.0 mm; capillary length=30 mm; and barrel diameter=12 mm.

EXPERIMENTAL

Process Stability Studies PA-1, PA-2, PA-3, PA-4, PA-5, PA-6, PA-7, PA-8, PRO-1, PRO-2, PRO-3, and PAB-1

Reactor—Ethylene was injected into an agitated (1600 rpm), 300 mL, high pressure continuous stirred tank reactor (CSTR), with an external heating jacket set to an external wall temperature, to achieve the specified internal reactor temperature ($T_{MAX}$ is the average temperature of three internal reactor temperatures, as measured by three thermocouples) for the amount of peroxide that was being fed. The peroxide initiator mixture was added directly to the reactor, through the sidewall of the reactor, through a separate nozzle from the ethylene. A poly (propylene glycol) allyl ether methacrylate (PPGAEM or PPG-AEMA; see structure below) mixture was added directly to the reactor, through the sidewall of the reactor, through a separate nozzle from the ethylene and the initiator mixture. The internal temperature of the reactor was increased, until a decomposition reaction occurred, raw material feed vessel contents were consumed, or a decision was made to move to a new set of experimental conditions. Table 1 shows data collected for the highest average internal reactor temperatures ($T_{MAX}$) achieved, over a 20 minute period, for the various experiments, when the PPGAEM flow was lined out, to achieve the targeted concentration.

Ethylene—Ethylene was compressed to 28750 psig and fed to the reactor at a flow rate of about 12 lb/hr.

Asymmetrical Diene—Poly (propylene glycol) allyl ether methacrylate (PPGAEM of PPG-AEMA) was loaded into a 316 stainless steel supply vessel, and diluted with ISOPAR E, to produce a final concentration of 7 wt %. For experiments with nitrogen (designated as N2 in Table 1), the headspace gas, the vessel was padded, de-padded, at least three times, with 70 psig nitrogen, before use, and kept under nitrogen pad during operation. For experiments with oxygen (designated as O2 in Table 1) in the headspace gas, the vessel was padded up to 70 psig and de-padded, at least three times, with an oxygen and nitrogen mixture at 600 mol ppm oxygen, before use. An oxygen and nitrogen mixture, at 600 mol ppm oxygen pad, at about 54 psig, was used while feeding to the reactor. The PPGAEM was fed independently into the top of the reactor, to achieve a concentration in ethylene ranging from about 100-230 mol ppm except for one case (PAB-1), where the PPGAEM concentration was zero.

Initiators—Peroxide initiator tert-butyl peroxyacetate (TPA, 20% by weight solution in ISOPAR H), peroxide initiator di-tert-butyl peroxide (DTBP, 20% by weight solution in ISOPAR™ H), and peroxide initiator 3,6,9-triethyl-3,6,9-trimethyl-1,4,7-triperoxonane (TRIGONOX 301, 41% by weight solution in aromatic free mineral spirit, with a CAS number 64742-47-8), were combined with ISOPAR E, in a second 316 stainless steel supply vessel, to produce an 1800 mass ppm TPA, 500 mass ppm DTBP, and 540 mass ppm TRIGONOX 301 mixture. The vessel was padded, de-padded, at least three times, with 70 psig nitrogen, before use, and kept under nitrogen pad during operation. The peroxide solution was fed, independently, into the top of the reactor, with adjustments to the concentration, to control the ethylene conversion at about 11 percent. The average TPA, DTBP, and TRIGONOX 301 concentration in the reactor was 1.4, 0.4, and 0.2 mol ppm, respectively.

Chain transfer agents—For experiments where propionaldehyde (PA) was used as the primary chain transfer agent, propionaldehyde with a purity higher than 99% was loaded into a 316 stainless steel supply vessel, and diluted with ISOPAR E, to produce a final concentration of 26 wt %. Nitrogen was used as the headspace gas, and the vessel was padded, de-padded, at least three times, with 1100 psig nitrogen, before use, and kept under an ultra-high 99.999% purity nitrogen pad during operation.

For experiments, where propylene (PRO) was used as the primary chain transfer agent, the propylene was fed from a propylene supply header, rather than from a supply vessel.

For all of the experiments, the primary chain transfer agent was added to the ethylene stream, before the mixture was compressed to 28750 psig, and injected into the reactor to ensure that a melt index of 2 or higher was achieved. A summary of the polymerization conditions and stability results are shown in Table 1.

TABLE 1

Process Stability Studies

| | Chain Transfer Agent | Headspace Gas for PPGAEM | $T_{MAX}$ (° C.) | PPGAEM concentration (mol ppm) | Chain Transfer Agent concentration (mol ppm) | Overall ISOPAR E concentration (mol ppm) | Decomp During Experiment? (Yes/No) |
|---|---|---|---|---|---|---|---|
| PA-1 | PA | O2 | 250 | 209 | 972 | 8203 | Yes |
| PA-2 | PA | O2 | 253 | 212 | 895 | 7577 | Yes |
| PA-3 | PA | O2 | 277 | 107 | 759 | 5054 | Yes |
| PA-4 | PA | O2 | 278 | 108 | 973 | 5446 | Yes |
| PA-5 | PA | N2 | 289 | 105 | 775 | 4669 | Yes |
| PA-6 | PA | N2 | 286 | 106 | 869 | 4657 | Yes |
| PA-7 | PA | N2 | 286 | 106 | 1231 | 5907 | No |
| PA-8 | PA | N2 | 294 | 212 | 785 | 8591 | Yes |
| PRO-1 | PRO | O2 | 301 | 226 | 9603 | 6909 | Yes |
| PRO-2 | PRO | N2 | 301 | 209 | 12769 | 6565 | Yes |
| PRO-3 | PRO | N2 | 300 | 210 | 12082 | 6632 | No |
| PAB-1 | PA | Not Applicable | 303 | 0 | 758 | 1567 | No |

It was discovered that, when using propionaldehyde as the primary chain transfer agent, in combination with the use of PPGAEM (PA-1, PA-2, PA-3, PA-4, PA-5, PA-6, PA-7, PA-8), the potential for decomposition reactions to occur, increased for the high pressure, low density polyethylene process, particularly when an oxygen headspace was used with the PPGAEM monomer. However, it was unexpectedly discovered that the inventive examples (PRO-1, PRO-2, and PRO-3) demonstrated the highest stable reactor temperatures, for runs with at least 200 mol ppm PPGAEM, when propylene was used as the primary chain transfer agent, along with an isoparaffinic solvent, which functioned as a secondary chain transfer agent in the process. A further reduction in the amount of oxygen present in the PPGAEM, and an ability to effectively cool the reactor within each reaction zone should also improve the stability the reactions, and thus, increase the maximum stable operating temperature.

Low Temperature Fouling Studies PHPA-1, PHPA-2, PHPRO-1, and PHPRO-2

Reactor—Before each experiment, the 300 mL high pressure continuous stirred tank reactor (CSTR) was opened, and the agitator and internal portion of the reactor were cleaned. After the reactor was reassembled, ethylene was injected into the agitated (1600 rpm) reactor, with an external heating jacket set to an external wall temperature of 195-200° C. Ethylene flow was adjusted from 26 to 32 lb/hr, to achieve an internal reactor temperature of about 140° C. For the experiments PHPA-2, PHPRO-1, and PHPRO-2, a poly (propylene glycol) allyl ether methacrylate (PPGAEM or PPG-AEMA) mixture was added directly to the reactor, through the sidewall of the reactor, for a minimum of 24 hours, through a separate nozzle from the ethylene, once the pressure, ethylene flow, and reactor temperatures had been stabilized. The run time for experiment PHPA-1 was 24 hours, and the run time for experiments PHPA-2, PHPRO-1, and PHPRO-2 averaged 40 hours. Four hours before the end of the experiments PHPA-2, PHPRO-1, and PHPRO-2, the PPGAEM flow was shut off, while maintaining the target ethylene flow and reactor temperatures. The reactor was then opened, and visually inspected for the extent of fouling. Table 2 shows data collected for the four experiments, and the relative fouling ranking, where a value of 1 represented the experiment with the least amount of fouling and a value of 3 represented the experiment with the most fouling.

Ethylene—Ethylene was compressed to 29000 psig, and fed to the reactor at a flow rate of about 26-32 lb/hr.

Asymmetrical Diene—For experiments using poly(propylene glycol) allyl ether methacrylate (PPGAEM), the PPGAEM was loaded into a 316 stainless steel supply vessel, and diluted with ISOPAR E, to produce a final concentration of 20 wt %. For experiments with nitrogen (designated as N2 in Table 2) as the headspace gas, the vessel was padded, and de-padded, at least three times, with 70 psig nitrogen, before use, and kept under nitrogen pad during operation. For experiments with oxygen (designated as O2 in Table 2) in the headspace gas, the vessel was padded, up to 70 psig, and de-padded, at least three times, with an oxygen and nitrogen mixture at 600 mol ppm oxygen, before use. An oxygen and nitrogen mixture, at 600 mol ppm oxygen pad, at about 46 psig, was used, while feeding to the reactor. The PPGAEM mixture was added directly to the reactor, through the sidewall of the reactor, for a minimum of 24 hours, through a separate nozzle, from the ethylene, to achieve a PPGAEM concentration of at least 250 mol ppm, once the pressure, ethylene flow, and reactor temperatures had been stabilized. The average PPGAEM concentration for the entire experimental period, including periods when PPGAEM was not being fed, exceeded 140 mol ppm for each of these runs.

Chain transfer agents—For experiments, where propionaldehyde (PHPA) was used as the primary chain transfer agent, propionaldehyde with a purity greater than 99% was loaded into a 316 stainless steel, supply vessel, and diluted with ISOPAR E, to produce a final concentration of 26 wt %. Nitrogen was used as the headspace gas, and the vessel was padded, de-padded, at least three times, with 1100 psig nitrogen, before use, and kept under a nitrogen pad during operation.

For experiments, where propylene (PHPRO) was used as the primary chain transfer agent, the propylene was fed from a propylene supply header, rather than from a supply vessel.

For all of the experiments, the primary chain transfer agent was added to the ethylene stream, before the mixture was compressed to 29000 psig, and injected into the reactor, to ensure a melt index of 0.7 or higher was achieved.

TABLE 2

Low Temperature Fouling Studies

| | CTA | Headspace Gas for PPGAEM | Average PPGAEM Concentration (mol ppm) 24 hours before Purge | Average PPGAEM Concentration (mol ppm) | Chain Transfer Agent Concentration (mol ppm) | Overall ISOPAR E Concentration (mol ppm) | Relative Fouling Rank* |
|---|---|---|---|---|---|---|---|
| PHPA-1 | PA | Not Applicable | 0 | 0 | 1200 | 1600 | 2 |
| PHPA-2 | PA | O2 | 280 | 140 | 1200 | 4000 | 3 |
| PHPRO-1 | PRO | N2 | 250 | 143 | 22000 | 2000 | 1 |
| PHPRO-2 | PRO | O2 | 250 | 155 | 22000 | 2000 | 2 |

*Ranking 1: Less than 50% of reactor surface area covered with a visible layer of polymer (equating to less than 5 g of polymer for every 300 cm$^2$ of reactor surface area), after opening the reactor and visually inspecting it. Ranking 2: More than 50% of reactor surface area covered with a visible layer of polymer, after opening the reactor and visually inspecting it, and at least 2 times as much polymer deposited as compared to that of a fouling ranking of 1. Ranking 3: More than 50% of reactor surface area covered with a visible layer of polymer after opening the reactor and visually inspecting it, and at least 2 times as much polymer deposited as compared to that of a fouling ranking of 2.

It was discovered that, when using propionaldehyde as the primary chain transfer agent, in combination with the use of PPGAEM (PHPA-2), there was an increased propensity for fouling, at low temperatures, for the high pressure, low density polyethylene process, when an oxygen headspace was used with the PPGAEM monomer. However, it was unexpectedly discovered, that the inventive example (PHPRO-1) demonstrated the lowest amount of fouling, when using PPGAEM, with a nitrogen headspace, with propylene as the primary chain transfer agent, and an isoparaffinic solvent, which functioned as a secondary chain transfer agent in the process.

Batch Reactor Process Stability Studies B-HEP-1, B-HEP-2, B-HEP-3, B-ACET-1, B-ACET-2, B-PA-1, B-PA-2, B-PA-3

For the low density polyethylene batch reactor process stability studies, the set-up described by Alberts et al., in "Thermal decomposition of Ethylene-comonomer mixtures under high pressure" AIChE Journal (1999), 45 (10), 2214-2222, was used. This set-up is designed for the study of reaction runaways. The volume of the autoclave reactor (or cell) was 215 ml. The wall temperature was controlled by electric heating outside the cell to achieve a starting temperature of 250° C. for the experiments. The cell was designed, without an agitator, to prevent any damage to the motor, due to the high temperature and pressures generated during the runaway reaction. The absence of the mixing, and the batch mode of operation, are believed to provide a more conservative (extreme case) representation of the behavior in a tubular reactor.

The following procedure was applied to test the reaction runaway potential of the various stability experiments.
1. The autoclave was purged with ethylene and heated up to the starting temperature.
2. The chain transfer agent, specified in Table 3, was purged with nitrogen and then added to the reactor, while pressurizing the autoclave with ethylene, to a pressure of about 1500 bar.
3. Ditertiarybutyl peroxide (DTBP) and enough polypropylene glycol allyl ether methacrylate, to achieve 600 mol ppm in ethylene, once injected into the reactor were mixed together into a feed vessel, and then purged with nitrogen to remove oxygen. If necessary, heptane was added as a solvent, to ensure the injected volume was, in all cases, 1 ml.
4. The mixture was then added into injection tubing at the entrance to the reactor.
5. Ethylene was allowed to flow into the reactor, to push the contents of the injection tubing into the reactor, and to pressurize the reactor up to 2000 bar.

Table 3 shows the chain transfer agents studied, and the corresponding amount used for the respective experiments, as well as the amount of DTBP used. The temperature of the reactor, 30 seconds after injection of the reaction components (T@ 30s), and the maximum temperature (Tmax) observed, were recorded when possible. For experiments where a decomposition (Decomp) occurred, the Tmax was not recorded.

The inventive examples in Table 3 are experiments B-HEP-1, B-HEP-2, and B-HEP-3. B-HEP-1. These examples illustrated that a lower "T@ 30s" and Tmax were achieved, when using the same amount of DTBP, relative to the respective temperatures observed for experiments with acetone (B-ACET-1) and propionaldehyde (B-PA-2). The data also illustrated that it was possible to use higher amounts of DTBP, without a decomposition reaction occurring for the inventive examples, than what was achievable with acetone (B-ACET-2) and propionaldehyde (B-PA-3).

TABLE 3

Batch Reactor Process Stability Studies

| Experiment | Chain Transfer Agent | Chain Transfer Agent Concentration in Ethylene (mol ppm) | DTBP in Ethylene (mol ppm) | T@ 30 s (° C.) | Tmax (° C.) | Decomp? |
|---|---|---|---|---|---|---|
| B-HEP-1 | Heptane | 11000 | 3.75 | 298 | 300 | No |
| B-HEP-2 | Heptane | 11000 | 3.95 | 296 | 298 | No |
| B-HEP-3 | Heptane | 11000 | 4.5 | 307 | 308 | No |
| B-ACET-1 | Acetone | 9756 | 3.75 | 311 | 316 | No |
| B-ACET-2 | Acetone | 9756 | 3.95 | 316 | N/A | Yes |
| B-PA-1 | Propionaldehyde | 1935 | 3.7 | 312 | 320 | No |
| B-PA-2 | Propionaldehyde | 1935 | 3.75 | 307 | 314 | No |
| B-PA-3 | Propionaldehyde | 1935 | 3.75 | 317 | N/A | Yes |

Figure 1:
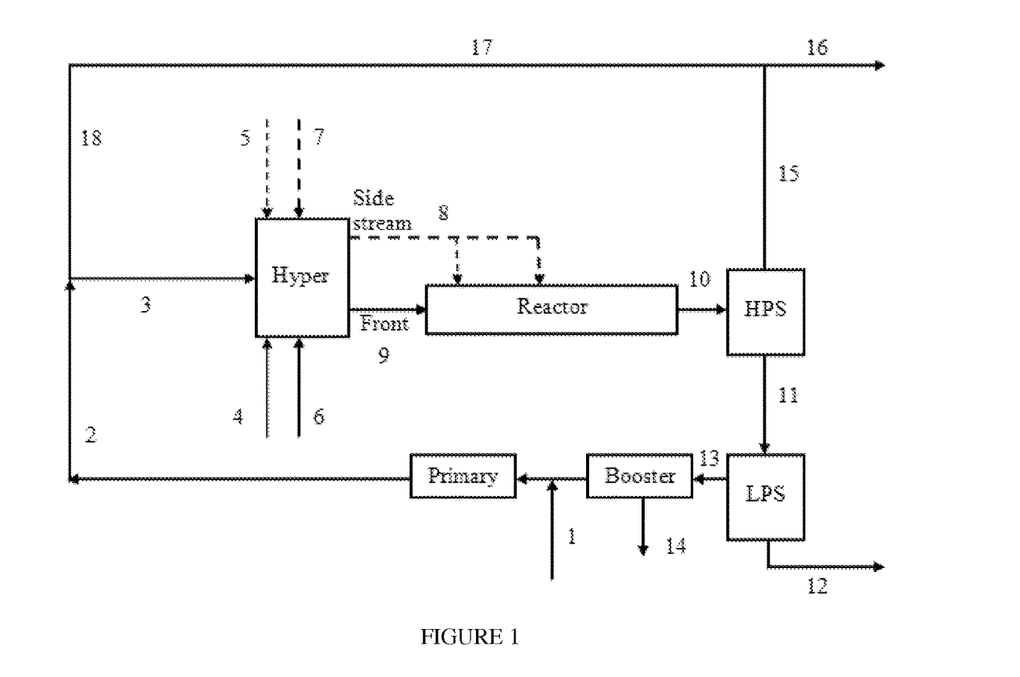
FIG. 1 depicts a flow scheme of a high pressure polymerization configuration.

The studies discussed above can be applied to polymerizations conducted in a reactor configuration comprising at least one tubular reactor. FIG. 1 shows a generalized flow scheme of a high pressure polymerization configuration (e.g., three reaction zones). Stream (1) is the fresh ethylene make-up, which is compressed together with the outlet of the booster compressor (Booster), by the primary compressor (Primary) to stream (2). Stream (2) is combined with high pressure recycle stream (18), and distributed over the suction inlets of the secondary compressor (Hyper). The secondary compressor pressurizes the ethylene feed streams to a level sufficient to feed the high pressure tubular reactor (Reactor). Although not depicted, the flow scheme could include partial combination and/or distribution of the stream (2) and stream (18) over the inlets of the secondary compressor.

Stream (4) and/or (5) depicts the make-up feed of the chain transfer agent (CTA) system. The CTA make-up can, in principle, be freely distributed over the main compression streams fed and/or distributed over the side stream (8) and front stream (9). CTA make-up streams (4) and/or (5) can be fed in the inlet(s), interstage(s), outlet(s) of the secondary compressor and/or inlet(s) of the reaction zones. The CTA system can consist of single and/or multiple components and could include varying compositions.

Stream (6) and/or stream (7) depict the branching agent feed. The branching agent feed can, in principle, be freely distributed over the main compression streams fed and/or distributed over the side stream (8) and/or front stream (9). Branching agent streams (6) and/or (7) can be fed in the inlet(s), interstage(s), outlet(s) of the secondary compressor, individual ethylene feed streams to the reactor or directly into the reaction zones. The discharge temperature of compressor is typically in the range of 60 to 100° C. The ethylene feed to the first reaction zone is typically preheated to a temperature between 130 to 180° C., while the ethylene of the side feed is fed to the reactor at Hyper discharge temperature, or is cooled prior to feeding to the reactor. The dimensions and configuration of the investigated tubular high pressure reactors (Reactor) may be as follows: inside tube diameter from 35 mm to 60 mm; each reaction zone length from 150 mm to 500 mm. In the reactor, the polymerization is initiated with the help of free radical initiation systems injected and/or activated at the inlet of each reaction zone. The maximum temperature in each reaction zone is controlled at a set point, by regulating the concentration and/or feed amount of initiation system at the start of each reaction zone. After finishing the reaction, and having applied multiple cooling steps, the reaction mixture is depressurized and/or cooled in (10), and separated in the high pressure separator (HPS). The high pressure separator separates the reaction mixture into an ethylene rich stream (15), containing minor amounts of waxes and/or entrained polymer, and a polymer rich stream (11), which is sent for further separation to the low pressure separator (LPS). Ethylene stream (15) is cooled down and cleaned in stream (17). Stream (16) is a purge stream to remove impurities and/or inerts.

The polymer separated in LPS is further processed in (12). The ethylene removed in the LPS is fed to the booster compressor (Booster), where during the compression condensables, like solvent, lubrication oil and other liquids, are collected and removed through stream (14). The outlet of the booster compressor is combined with the make-up ethylene stream (1), and further compressed by the primary compressor.

Figure 2:
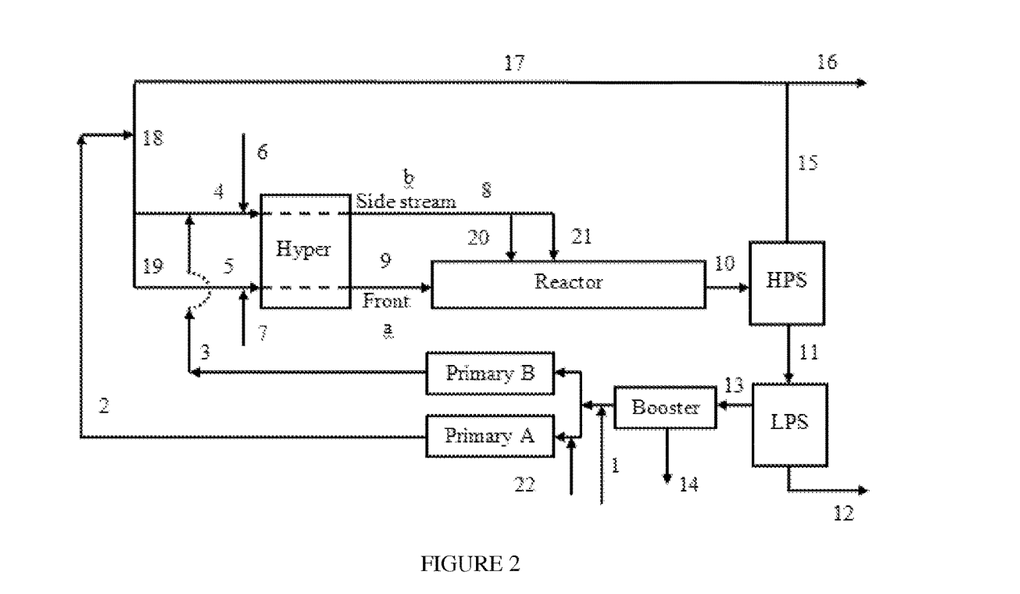
FIG. 2 shows a flow diagram used for Comparative Example A', Inventive Examples 1' and 2'.

Description of Flow Diagram Used for Comparative Example A' and Inventive Example 1' and 2'

FIG. 2 shows the flow scheme of the high pressure polymerization process with a tubular reactor used to produce comparative example A' and inventive examples 1', 2' and 4. Stream (1), fresh ethylene make-up, is compressed together with the outlet of the Booster by two parallel Primary compressors A+B, both have similar capacity, resulting in flow (2) and flow (3). CTA is added through (22) to the feed of Primary compressor A. Stream (2) is combined with high pressure recycle stream (18), and distributed over flow (4) and flow (19). The Hyper compressor part feeding the front (9) of the reactor, receives from line (18) ethylene feed through line (19) and line (5). The Hyper compressor part feeding the side stream (8) receives ethylene feed through line (4). Line (4) receives ethylene feed from line (3) and additional ethylene from line (18). The Hyper pressurizes the ethylene feed streams to a level sufficient to feed the high pressure tubular reactor (Reactor).

Stream (6) and/or stream (7) depict the polyene feed. Information about the Reactor system can be found below. In the Reactor, the polymerization is initiated with the help of free radical initiation systems, injected and/or activated at the inlet of each reaction zone. The maximum temperature in each reaction zone is controlled at a set point by regulating the concentration and/or feed amount of initiation system at the start of each reaction zone. After finishing the reaction, and having applied multiple cooling steps, the reaction mixture is depressurized and/or cooled in (10), and separated in the high pressure separator (HPS). The HPS separates the reaction mixture into an ethylene rich stream (15), containing minor amounts of waxes and/or entrained polymer, and a polymer rich stream (11) which is sent for further separation to the LPS. Ethylene stream (15) is cooled and cleaned in stream (17). Stream (16) is a purge stream to remove impurities and/or inerts.

The polymer separated in LPS is further processed in (12). The ethylene removed (13) in the LPS is fed to the Booster, where, during the compression, condensables such as solvent, lubrication oil and others are collected and removed through stream (14). The outlet of the Booster is combined with make-up ethylene stream (1), and further compressed by the Primary compressors Additional Polymerizations—Example A' Comparative LDPE

The polymerization was carried out in tubular reactor with three reaction zones (FIG. 2). In each reaction zone, pressurized water was used for cooling and/or heating the reaction medium, by circulating this water through the jacket of the reactor. The inlet-pressure was 2220 bar, and the pressure drop over the whole tubular reactor system was about 300 bars. Each reaction zone had one inlet and one outlet. Each inlet stream consisted of the outlet stream from the previous reaction zone and/or an added ethylene-rich feed stream. The non-converted ethylene, and other gaseous components in the reactor outlet, were recycled through a high pressure recycle and a low pressure recycle, and were compressed and distributed through the booster, primary and hyper (secondary) compressor systems, according flow scheme shown in FIG. 2. Organic peroxides (see Table 4) were fed into each reaction zone. Iso-butane was used as a chain transfer agent (CTA), and it was present in each reaction zone inlet, originating from the low pressure and high pressure recycle flows (#13 and #15), as well as from freshly injected CTA make-up stream #22. The make-up ethylene is fed through stream #1.

After reaching the first peak temperature (maximum temperature) in reaction zone 1, the reaction medium was cooled with the aid of the pressurized water. At the outlet of reaction zone 1, the reaction medium was further cooled by injecting a fresh, cold, ethylene-rich feed stream (#20), and the reaction was re-initiated by feeding an organic peroxide system. This process was repeated at the end of the second reaction zone to enable further polymerization in the third reaction zone. The polymer was extruded and pelletized (about 30 pellets per gram), using a single screw extruder at a melt temperature around 230-250° C. The weight ratio of the ethylene-rich feed streams to the three reaction zones was 1.00:0.80:0.20. The internal process velocity was approximately 12.5, 9 and 11 m/sec for, respectively, the $1^{st}$, $2^{nd}$ and $3^{rd}$ reaction zones. Additional information can be found in Tables 5 and 6.

Example 1' Inventive Ethylene-Based Polymer

The polymerization was carried out in tubular reactor with three reaction zones, as discussed above for Comparative A'. All process conditions are the same as for Comparative Example A', except the rheology modifier (PPG-AEMA=Polypropylene glycol allyl ether methacrylate) was added via stream #7 and #6 from a feed vessel with a "nitrogen-based head-space gas" comprising less than 1.0 volume percent oxygen. The amount of PPG-AEMA fed can be found in Table 6. Additional information can be found in Table 5.

PPG-AEMA structure and additional properties for PPG-AEMA can be found below:

Mn of about 280 g/mole; n from about 1 to about 10; isomeric oligomeric mixture, for each n, $R_a$=H and $R_b$=CH3, and $R_a$=CH3 and $R_b$=H).

Synthesis of Asymmetrical Diene Poly(propylene glycol) allyl ether methacrylate (PPG-AEMA).

All methacrylate monomers in this application were prepared in accordance with the method of Example 1 in U.S. Pat. No. 4,916,255. In this case, XUS-13402.00, a polyglycol, commercially available from The Dow Chemical Company, was used to make the poly (propylene glycol) allyl ether methacrylate.

Example 2' (Inventive Ethylene-Based Polymer)

The polymerization was carried out in tubular reactor with three reaction zones, as discussed above for Inventive Example 1'. All process conditions are the same as for Example 1', except propylene was used as CTA, and CTA was added via stream #22 (see FIG. 2), and the inlet pressure of reaction zone 1 was lowered. The PPG-AEMA fed from the feed vessel to the process, and the feed vessel had a "nitrogen-based head-space gas" comprising less than 1.0 volume percent oxygen. The PPG-AEMA was deoxygenated by contacting the PPG-AEMA stream with nitrogen, and transferring the combined mixture through a static mixer, before it entered the feed vessel. This process was repeated several times (mixture of N2 and PPG-AEMA removed from feed vessel, and sent through the static mixer), until the desired oxygen level was reached in the PPG-AEMA. The final oxygen concentration in the PPG-AEMA was less than 10% of the starting concentration (ppm, as measurement, based on the total weight of the PPG-AEMA plus oxygen), at standard temperature and pressure, with air as the "head-space gas" in the starting concentration. Each measurement was made using a K1100-KTO-P-MET oxygen sensor and controller system from Hache Lange, with a K1100-SOO sensor and a 410K/P1C00000 controller. The oxygen sensor and controller system were calibrated using a Henry's law constant for oxygen of "244 L*atm/mol," wherein "L" refers to the "liter amount of PPG-AEMA" and 'mol' refers to "moles of oxygen in the PPG-AEMA" Additional information can be found in Tables 5A, 5B and 6. Polymer properties are shown in Table 7 below.

TABLE 4

Initiators

| Initiator | Abbreviation | Used in Rx-zone 1/2/3 |
|---|---|---|
| tert-Butyl peroxy-2-ethyl hexanoate | TBPO | yes/yes/no |
| Di-tert-butyl peroxide | DTBP | yes/yes/yes |

TABLE 5A

Pressure and temperature conditions of comparative and inventive examples

| Ex. | Type | Inlet-pressure/ bar | Start-temp./° C. | reinitiation temp. 2nd zone/ ° C. | reinitiation temp. 3rd zone/ ° C. | 1st Peak temp./° C. | 2nd Peak temp./° C. | 3rd Peak temp./° C. |
|---|---|---|---|---|---|---|---|---|
| A' | Comp. | 2220 | 140 | 150 | 207 | 294 | 292 | 294 |
| 1' | Inv. | 2220 | 144 | 148 | 211 | 293 | 293 | 293 |
| 2' | Inv. | 2155 | 145 | 148 | 217 | 293 | 293 | 294 |

TABLE 5B

CTA Distribution

| | Mass fraction of Fresh Ethylene in reaction zone Ethylene feed* | | | Wt Ratio of CTA concentration in Ethylene reactor feeds** | |
|---|---|---|---|---|---|
| Ex. | Rx-Z1 | Rx-Z2 | Rx-Z3 | Rx-Z1/Rx-Z2 | Rx-Z1/Rx-Z3 |
| A' | 0.17 | 0.39 | 0.39 | 1.36 | 1.36 |
| 1' | 0.16 | 0.39 | 0.39 | 1.36 | 1.36 |
| 2' | 0.16 | 0.39 | 0.39 | 1.38 | 1.38 |

*Mass fraction of fresh ethylene is the ratio of the amount of fresh ethylene in the feed stream to the total amount of the ethylene-based feed stream.
**Wt ratio of CTA is determined by mass balance calculations over the process flow streams, taking into account the conversions in the reactor and the location and/or distribution of the fresh ethylene flow stream and the location and/or distribution of the fresh CTA flow stream

TABLE 6

Additional information of the comparative and inventive examples

| Ex. | PPG-AEMA flow kg of diene per hour (1st/2nd/3rd zone) | PPG-AEMA (mole ppm diene in ethylene-based feed stream in each reaction zone***) (1st/2nd/3rd zone) | CTA | Ratio CTA concentration in front versus sequential feed flows* | Total Hyper throughput ton per hour | Polymer output ton per hour** |
|---|---|---|---|---|---|---|
| A' | 0/0/0 | 0/0/0 | Iso-butane | >1 | 54.2 | 15.0 |
| 1' | 38/18/5 | 142/86/86 | Iso-butane | >1 | 54.2 | 14.9 |
| 2' | 48/21/5 | 172/94/94 | Propylene | >1 | 56.4 | 15.5 |

Note:
*Ratio(s) of CTA concentration in the front ethylene-based feed versus the concentrations of CTA in sequential ethylene-based feed streams.
**Polymer output was calculated from fresh ethylene (#1), CTA (#22 and or #23) and PPG-AEMA (#6 and or #7) intakes corrected for process purge stream (#16).
***Ethylene-based feed stream in each reaction zone refers to the feed stream compressed and fed by the hypercompressor, and containing a majority amount ethylene (for examples, greater than 80 wt % ethylene). Other components, such as comonomer, CTA, peroxide dissociation products, solvent, etc., may also be present.

TABLE 7

| | Polymer properties of the examples | | |
|---|---|---|---|
| Ex. | MI ($I_2$) (g/10 min) | Melt Strength (cN) | Density (g/cm³) |
| A' | 4.0 | 4.3 | 0.9243 |
| 1' | 3.9 | 8.9 | 0.9248 |
| 2' | 4.1 | 7.4 | 0.9204 |

Summary of Results for Polymerizations A' and 1'-2'

As shown by the Inventive Examples 1' and 2', the ethylene-based polymers t have higher melt strengths, as a result of the use of the use of PPG-AEMA as a rheology modifier, and were produced with good process and reactor stability, at similar reactor conditions to the Comparative Example A' without the rheology modifier. This is attributed to the selection of the saturated and unsaturated hydrocarbon chain transfer agents used in the process, as well an optional treatment (Ex. 2') of the rheology modifier to reduce the oxygen concentration to a low level.

The invention claimed is:

1. A process to form an ethylene-based polymer, said process comprising polymerizing ethylene and at least one asymmetrical polyene, comprising an "alpha, beta unsaturated—carbonyl end" and a "C—C double bond end," and wherein the polymerization takes place in the presence of at least one free-radical initiator, and wherein the polymerization takes place in a reactor configuration comprising at least two reaction zones, reaction zone 1 and reaction zone i (i≥2), wherein reaction zone i is downstream from reaction zone 1; and wherein at least one chain transfer agent (CTA) is added to the polymerization, and wherein the CTA is a saturated hydrocarbon or an unsaturated hydrocarbon.

2. The process of claim 1, wherein the CTA is selected from an alkane, an alkene, or a combination thereof.

3. The process of claim 1, wherein the polyene is subject to an "oxygen removal step" prior to being fed to a reaction zone.

4. The process of claim 1, wherein the polyene is stored in a feed vessel, and wherein the feed vessel has a "headspace gas" comprising less than 5.0 volume percent oxygen.

5. The process of claim 1, wherein the polyene is fed through a compression stage directly into the reaction zone or directly into the feed to the reaction zone.

6. The process of claim 1, wherein the polyene is fed directly into the reaction zone or directly into the feed to the reaction zone.

7. The process of claim 1, wherein the maximum temperature of the first reaction zone is greater than the maximum temperature of each consecutive reaction zone, downstream from the first reaction zone.

8. The process of claim 1, wherein the maximum temperature of the last reaction zone is less than the maximum temperature of each prior reaction zone.

9. The process of claim 1, wherein no polyene is fed to reaction zone 1.

10. The process of claim 1, wherein more polyene is added to reaction zone i, as compared to the amount of polyene added to reaction zone 1.

11. The process of claim 1, wherein the ethylene fed to the first reaction zone is from 10 to 100 percent of the total ethylene fed to the polymerization.

12. The process of claim 1, wherein the process takes place in a reactor configuration that comprises at least one tubular reactor.

13. The process of claim 1, wherein the asymmetrical polyene is selected from the group consisting of the following i) through x):

i)

wherein n is from 1 to 50; Ra is selected from H or alkyl; Rb is selected from H or alkyl;

ii)

iii)

iv)

v)

vi)

vii)

viii)

ix)

; and where m=1 to 20.